United States Patent
Nageli et al.

(10) Patent No.: US 10,560,312 B2
(45) Date of Patent: Feb. 11, 2020

(54) MULTI-MODE CONFIGURABLE NETWORK AUDIO

(71) Applicant: Harman International Industries, Incorporated, Stamford, CT (US)

(72) Inventors: Shawn Nageli, South Jordan, UT (US); Iain Gregory, Northville, MI (US); Jon Sager, Newbury Park, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 87 days.

(21) Appl. No.: 15/808,829

(22) Filed: Nov. 9, 2017

(65) Prior Publication Data

US 2018/0139087 A1    May 17, 2018

Related U.S. Application Data

(60) Provisional application No. 62/421,346, filed on Nov. 13, 2016.

(51) Int. Cl.
*H04L 12/24* (2006.01)

(52) U.S. Cl.
CPC .................. *H04L 41/0654* (2013.01)

(58) Field of Classification Search
CPC ............. G06F 11/2002; H04L 41/0654; H04R 2227/003; H04R 27/00; H04R 29/007
USPC ......................................................... 370/328
See application file for complete search history.

(56) References Cited

U.S. PATENT DOCUMENTS

| | | | | |
|---|---|---|---|---|
| 8,848,608 | B1* | 9/2014 | Addepalli | H04W 4/046 370/328 |
| 9,344,328 | B1* | 5/2016 | Bishara | H04L 49/552 |
| 9,438,471 | B1* | 9/2016 | Amdahl | H04L 41/0695 |
| 2003/0123788 | A1* | 7/2003 | Miller | G02B 6/3556 385/18 |
| 2004/0165525 | A1* | 8/2004 | Burak | H04L 45/06 370/228 |
| 2005/0147410 | A1* | 7/2005 | Smith | H04B 10/032 398/5 |
| 2006/0085540 | A1* | 4/2006 | Mayerson | H04L 43/0817 709/224 |
| 2006/0274642 | A1* | 12/2006 | Litvin | H04L 41/0654 370/216 |
| 2007/0260965 | A1* | 11/2007 | Schmidt | H04L 1/0045 714/799 |

(Continued)

OTHER PUBLICATIONS

Extended European Search Report for Application No. 17200823.7 dated Feb. 7, 2018.

(Continued)

*Primary Examiner* — Robert J Lopata
(74) *Attorney, Agent, or Firm* — Artegis Law Group, LLP

(57) ABSTRACT

In one embodiment, an audio device includes a plurality of ports. The audio device receives, from a first network via a first port included in the plurality of ports, at least one of a first audio signal and a first control signal. The audio device transmits the at least one of the first audio signal and the first control signal to an audio output device. In case of a fault associated with the first port, the audio device transmits at least one of a second audio signal and a second control signal to the audio output device, where the at least one of the second audio signal and the second control signal is received from a second network via a second port included in the plurality of ports.

20 Claims, 10 Drawing Sheets

(56) References Cited

U.S. PATENT DOCUMENTS

| | | | | |
|---|---|---|---|---|
| 2009/0138935 | A1* | 5/2009 | Ohkita | G09G 5/006 725/134 |
| 2009/0244391 | A1* | 10/2009 | Kitami | H04N 5/4401 348/705 |
| 2010/0107154 | A1* | 4/2010 | Brahmavar | G06F 11/1433 717/176 |
| 2010/0322417 | A1* | 12/2010 | Altmann | G09G 5/006 380/237 |
| 2011/0044469 | A1 | 2/2011 | Braithwaite et al. | |
| 2011/0051598 | A1* | 3/2011 | Oldershaw | H04J 3/14 370/221 |
| 2012/0099425 | A1* | 4/2012 | Wang | H04L 12/437 370/225 |
| 2013/0329547 | A1* | 12/2013 | Takase | H04L 41/0654 370/220 |
| 2014/0064059 | A1* | 3/2014 | Shin, II | H04L 41/0668 370/221 |
| 2014/0254352 | A1* | 9/2014 | Natarajan | H04L 45/28 370/228 |
| 2016/0139983 | A1* | 5/2016 | Chang | G11C 29/52 714/53 |
| 2018/0120375 | A1* | 5/2018 | Liu | G01R 31/2825 |

OTHER PUBLICATIONS

Yamaha Commercial Audio Team: "White Paper: Networked audio system design with CobraNet", Yamaha Commercial Audio, Jan. 1, 2006, URL:http://download.yamaha.com/api/asset/file/?language=en&site=countrysite-master.prod.wsys.yamaha.com&asset id=47405, 16 pages.

Yamaha: "Digital Mixing Engine Satellite Owner's Manual", Jan. 1, 2007, URL: http://download.yamaha.com/api/asset/file?language=en&site=countrysite-master.prod.wsys.yamaha.com&asset id=8194, 52 pages.

Audinate: "Dante Controller User Guide", Dec. 16, 2014, URL: https://web.archive.orgjweb/20150626101900/http://dev.audinate.com/GA/dante-controller/userguidefpdf/latest/AUO-MAN-DanteController-3.5.x-v1.6.pdf, 84 pages.

Hedd: "Audio-over-IP compatible Studio Monitors by HEDD", Jul. 3, 2016, URL:https://web.archive.org/web/20160703154959/http://www.hedd.audiojenjaudio-over-ip/, 4 pages.

Yamaha Commercial Audio Team: "White paper: An introduction to networked audio" Jan. 1, 2014, URL:http://stepp.be/media/files/networkedaudio introduction_en_2nd.pdf, 17 pages.

* cited by examiner

MULTI-MODE CONFIGURABLE NETWORK AUDIO

CROSS-REFERENCE TO RELATED APPLICATIONS

This application claims priority benefit of the U.S. Provisional Patent Application titled, "NETWORK AUDIO POWERED LOUDSPEAKER MODULE," filed on Nov. 13, 2016, and having Ser. No. 62/421,346. The subject matter of this related application is hereby incorporated herein by reference.

BACKGROUND

Field of the Various Embodiments

The various embodiments relate generally to audio systems and, more specifically, to multi-mode configurable network audio.

Description of the Related Art

Many audio systems include the capability to receive audio and/or control signals through a network (e.g., a local area network). In a network audio system, audio components are connected to a networking device that transmits audio and/or control signals from a central system, such as an audio console. For example, a network audio system may include multiple speakers connected to a network switch. The multiple speakers receive audio and control signals from the central system via the network switch. Such network audio systems allow different types of audio to be implemented in a variety of venues and configurations.

A conventional network audio system may include a central system that transmits audio and control signals to speakers on a single communication channel. The speakers in the system may connect to the single communication channel via, for example, a network switch. However, if the channel fails (e.g., the switch fails or a networking cable from the central system to the switch fails), then the speakers may all lose connectivity to the single communication channel and, thus, may lose both the audio and control signals entirely.

In order to address such shortcomings, conventional network audio systems may be implemented with fault tolerance. Network audio systems that include fault tolerance typically implement redundant communication channels and redundant physical connections between audio components and the central system. One downside of such approaches is that, when such systems are implemented in a large venue—where audio components may be positioned far away from the central system or an intermediary networking device in the system—the length, weight, and/or price of cabling to physically connect each audio component via both a main connection and a backup connection can be significant. Consequently, many systems forgo redundant connections to audio components, leaving such systems vulnerable to failure.

As the foregoing illustrates, what is needed in the art are more effective techniques for providing redundancy and flexibility in network audio components.

SUMMARY

One embodiment sets forth a method for transmitting audio signals at an audio device having a plurality of ports. The method includes receiving, from a first network via a first port included in the plurality of ports, at least one of a first audio signal and a first control signal; transmitting the at least one of the first audio signal and the first control signal to an audio output device; detecting a failure associated with the first port; and in response to detecting the failure, transmitting at least one of a second audio signal and a second control signal to the audio output device, where the at least one of the second audio signal and the second control signal is received from a second network via a second port included in the plurality of ports.

Further embodiments provide, among other things, an audio device and a computer-readable storage medium configured to implement the method set forth above.

At least one advantage of the disclosed techniques is that a network audio device can be configured to provide various levels of fault tolerance while also reducing physical cabling requirements of a network audio system. Particularly, a network audio device may be configured to implement direct connections and/or serial connections, thereby facilitating fault tolerance and/or reduced cabling costs. By providing for serial connections, cabling costs may be reduced. Furthermore, the techniques described herein enable mixing of direct connections and serial connections within a network audio system, which provides users of network audio systems more flexibility in adapting network audio systems to different venues and requirements.

BRIEF DESCRIPTION OF THE DRAWINGS

So that the manner in which the above recited features can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

System Overview

Figure 1:
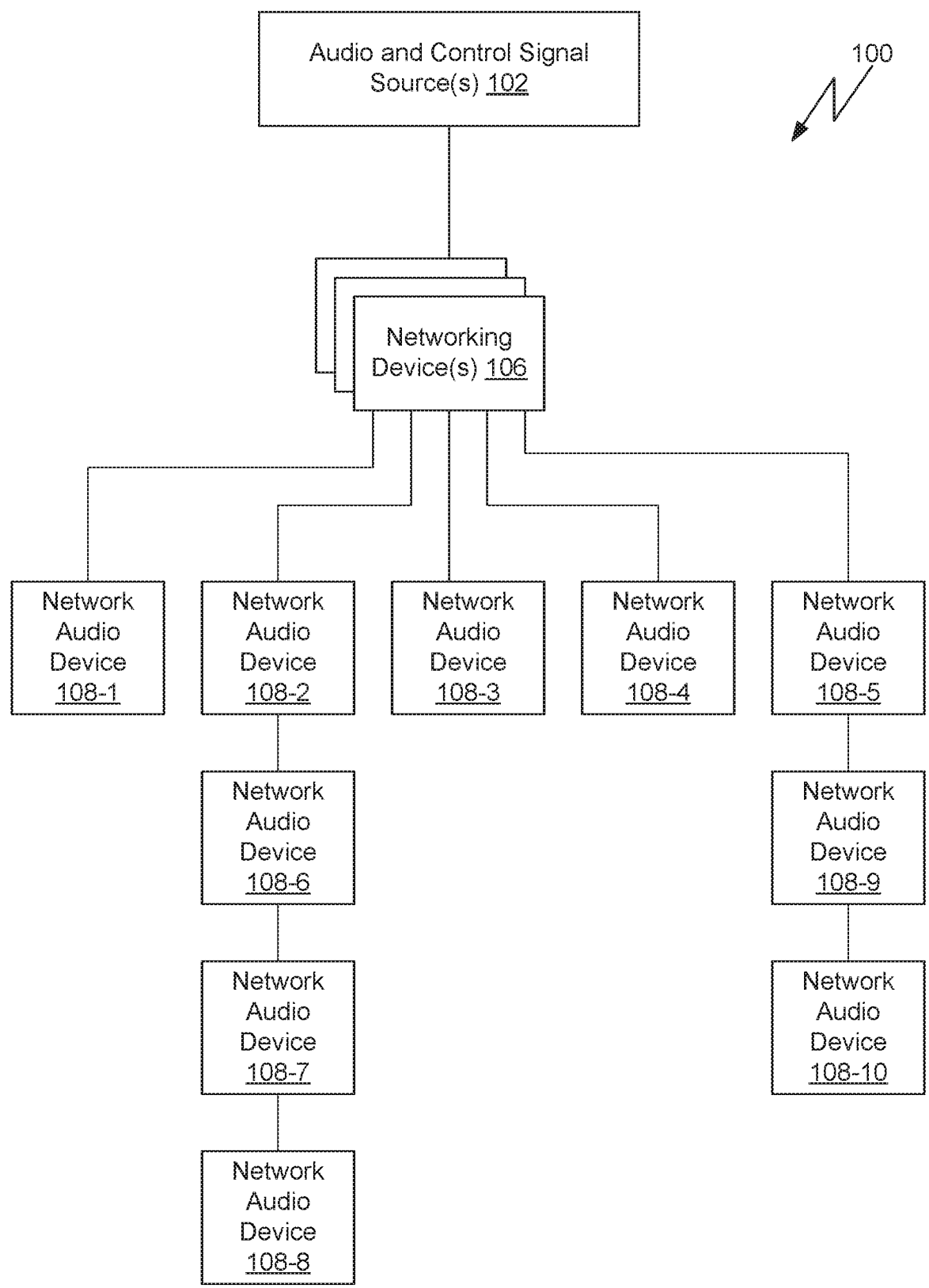
FIG. 1 is a conceptual diagram of a network audio system, according to one or more aspects of the various embodiments.

FIG. 1 illustrates a network audio system 100 according to one or more aspects of the various embodiments. Network audio system 100 includes one or more audio and control signal sources 102, one or more networking devices 106, and one or more network audio devices 108.

The audio and control signal source(s) 102 may generate and transmit audio signals and control signals to network audio devices 108 via networking devices 106. For example, the source(s) 102 may generate audio signals and/or control signals, which are then transmitted to the network audio devices 108 within the network audio system 100. In some embodiments, the source(s) 102 receive and process audio input (e.g., audio captured by a microphone, pre-recorded audio, etc.) and generate, from the processed audio input, audio signals suitable for transmission to network audio devices 108. Processing of audio input by the source(s) 102 may include, for example, audio signal processing, mixing, equalization, level adjustments, adding effects (e.g., reverb), etc. In some embodiments, generating the audio signals may include generating audio signals that comply with a network audio protocol or standard that is implemented at the network audio devices 108. It should be appreciated that source(s) 102 may include any number of sources. For clarity of explanation, the embodiments described herein are described in conjunction with a single source 102.

Source 102 may also generate and transmit control signals to network audio devices 108. In various embodiments, the control signals may be generated in accordance with user commands and/or predefined rules. For example, a user may issue commands to a source 102 and/or to a device in communication with the source 102 in order to control network audio devices 108 in a certain manner (e.g., to set or change a parameter at the network audio devices 108, to change the operation status of a particular network audio device 108, etc.). The source 102 may then generate control signals in order to apply the user-issued commands to the network audio devices 108. As another example, source 102 may generate control signals based on a predefined rule (e.g., to set or change a parameter at the network audio devices 108 if the audio input meets the condition specified in a rule) in order to apply a result specified in the rule to the network audio devices 108. Examples of commands to a network audio device 108 may include muting or unmuting the device, powering on or powering off the device, sleeping or waking the device, changing the orientation or direction of the device, setting or changing a particular parameter (e.g., gain, frequency range, phase, etc.) at the device, configuring a mode of operation of a port on the device, and so forth. An example of a predefined rule include setting or changing a parameter at the device if a parameter associated with the audio input or audio signal reaches a defined threshold.

A source 102 may be any suitable computing system or device that includes one or more processors, a memory, and one or more network interfaces for communicating with networking devices 106. A source 102 may also include any suitable hardware and/or software configured to process audio input, generate audio and/or control signals, transmit the audio and/or control signals to network audio devices 108 via networking devices 106, and/or perform any other function needed to facilitate the generation of audio and/or control signals. In some embodiments, source 102 may be an audio console, a desktop computer, a laptop computer, etc.

In general, audio signals include signals that carry audio data from which audible audio output may be generated. In some embodiments, the audio signals are digital audio signals. Generating audio output from the audio signals may include performing various types of processing on the audio signals. For example, in some embodiments, digital signal processing (DSP) techniques could be performed to modify characteristics of the audio signals. Processing may also include, for example, decoding a digital audio signal. The audio output may be generated via one or more audio output devices at a network audio device 108. In various embodiments, the audio signals may comply with any suitable network audio protocol or standard. An example of a network audio protocol or standard is the DANTE™ protocol.

In general, control signals may include signals that carry data for controlling a network audio device 108, such as data that corresponds to a user-issued command or an application of a rule. Control signals may include signals for controlling, for example, the gain, frequency characteristics, phase, and/or other audio or control parameters associated with the network audio device 108. In some embodiments, the control signals comply with any suitable control protocol or standard for network audio devices. An example of a control protocol or standard that could be implemented to control the network audio devices 108 is the HIQNET™ protocol.

In some embodiments, control signals may also include signals for configuring modes of operation of one or more ports 216 included in a network audio device 108. In the different modes of operation, a particular port 216 may transmit and/or receive audio signals and/or control signals. Further details regarding the different modes of operation of the ports 216 are provided below in conjunction with FIGS. 2-6.

Source 102 is communicatively coupled to network audio devices 108 via one or more communications networks formed by one or more networking devices 106. The network(s) formed by the one or more networking devices 106 may include wired networks, wireless networks, local area networks (LANs), wide area networks (WANs), and the Internet. In some embodiments, the source 102 is communicatively coupled to two or more local area networks formed by network devices 106. In such embodiments, source 102 may transmit audio signals and control signals to one or more network audio devices 108 via the two or more networks. In the same or other embodiments, source 102 is communicatively coupled to a local area network formed by network devices 106. In such embodiments, source 102 may transmit audio signals and control signals to one or more network audio devices 108 via the network.

Networking devices 106 may be configured to form multiple communications networks (e.g., LAN, WAN, etc.). Networking devices 106 may include any number of routers, switches, gateway devices, network hubs, modems, and other network devices 106 suitable for establishing one or more communications networks. In some embodiments, the networking devices 106, when connected, are configured to establish one or more communications networks (e.g., one LAN, multiple LANs) via which audio and/or control signals are transmitted from the source 102 to the network audio devices 108.

The network audio devices 108 receive audio signals and control signals from the source 102 via the network(s) formed by the networking devices 106. A network audio device 108 transmits the received audio and control signals to an audio output device that is included in or is connected to the network audio device 108. In some embodiments, a network audio device 108 may process the received audio and control signals before transmitting the audio and control signals to the audio output device.

A network audio device 108 may be connected to one or more of the network(s) and/or to another network audio device 108. In some embodiments, a network audio device 108 may be connected to a network by being directly connected (e.g., by a wired connection) to a networking device 106 included in the network. As used herein, a "direct connection" or being "directly connected" refers to a connection from a network audio device 108 to a networking device 106 included in a network. A direct connection may be a wired connection (e.g., connected by a cable or wire) or a wireless connection. In some embodiments, the cable for a wired direct connection may be an Ethernet cable (e.g., Cat. 5E cable, Cat. 6 cable). A direct connection may also be referred to as a "home run" connection.

In some embodiments, a network audio device 108 may be serially connected to one or more other network audio devices 108. As used herein, a "serial connection" refers to a connection from one network audio device 108 to another network audio device 108. Two or more network audio devices 108 connected in series by serial connections may be referred to as network audio devices that are "daisy chained" or connected "in a daisy chain." A serial connection may be a wired connection (e.g., connected by a cable or wire) or a wireless connection. In some embodiments, the cable for a wired serial connection may be an Ethernet cable.

In some embodiments, a network audio device 108 may be directly connected to one or more networking devices 106, each included in a respective network, and/or serially connected to one or more other network audio devices 108. For example, as shown in FIG. 1, multiple network audio devices 108-1 thru 108-5 could be connected to the networks formed by the networking devices 106, via direct connections to networking devices 106 included in the networks. As shown, network audio devices 108-2 and 108-6 thru 108-8 are serially connected. Network audio devices 108-5 and 108-9 and 108-10 are serially connected. Thus, within network audio system 100, a network audio device 108 may be connected to the network(s) formed by network audio devices 106 via direct connections to networking devices 106, and/or serially connected to one or more other network audio devices. The arrangement and connections of the network audio devices 108 to networking devices 106 and with each other form a connection configuration of network audio devices 108. Examples of different connection configurations that could be implemented in various embodiments are described below in conjunction with FIGS. 3A-3C, 4A-4B, and 5-6.

Each network audio device 108 includes multiple ports 216 for directly connecting to networking devices 106 or to other network audio devices 108. The ports 216 may receive audio signals and/or control signals via one or more networks and/or via another network audio device 108. The ports may also be configurable to transmit audio signals and/or control signals to another network audio device 108 (e.g., a network audio device 108 that is connected to a networking device 106 via a serial connection). In some embodiments, the ports 216 may be configured based on a default, initial configuration. A user at the source 102 may issue a command to change the configuration, for example, by issuing a command included in a control signal that is transmitted from the source 102 to the network audio device 108.

Figure 2:
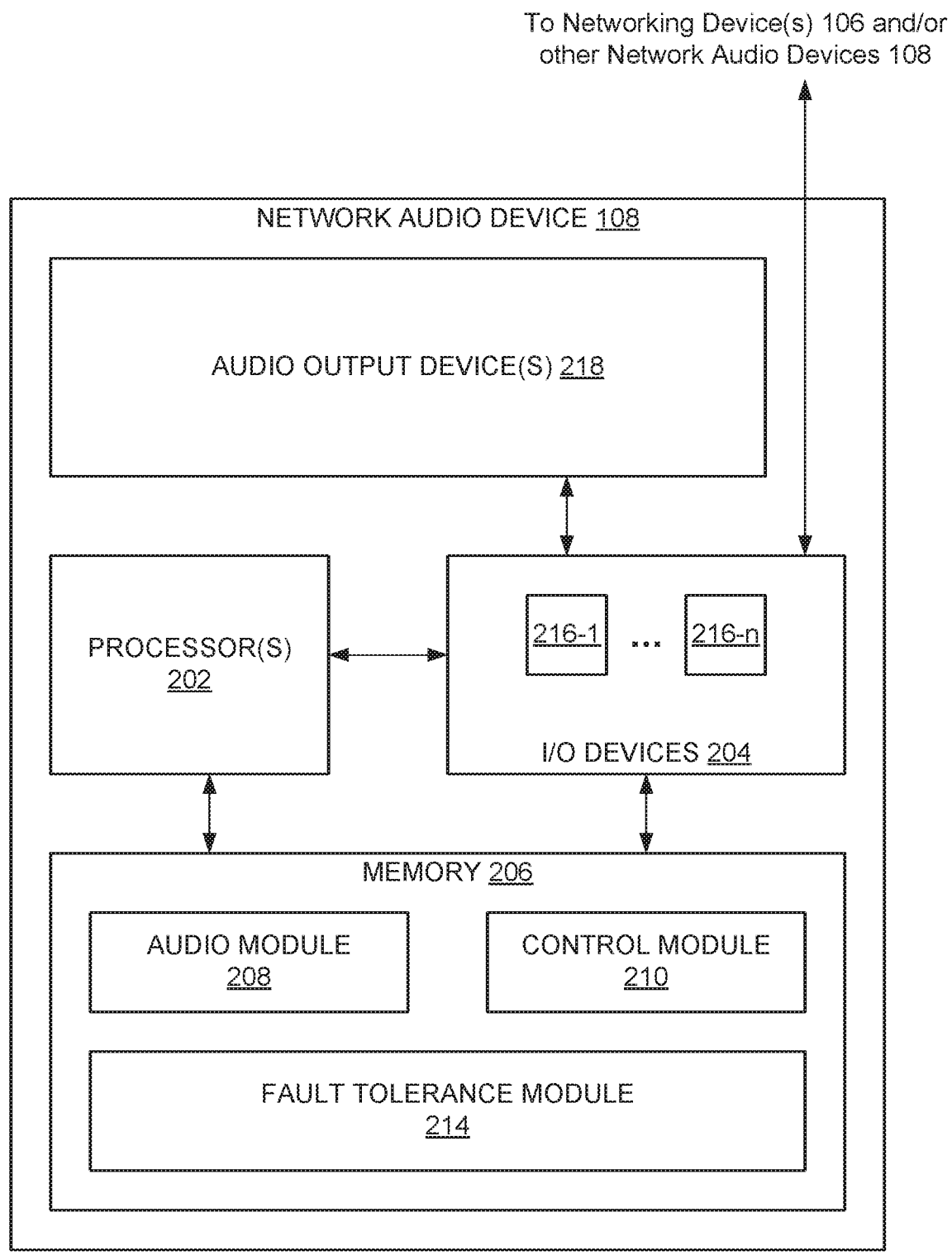
FIG. 2 is a block diagram of a network audio device of the network audio system, according to one or more aspects of the various embodiments.

FIG. 2 is a block diagram of a network audio device 108 of the network audio system 100, according to one or more aspects of the various embodiments. As shown, a network audio device 108 may include one or more processors 202, I/O devices 204, memory 206, and one or more audio output devices 218.

The processor 202 may be any technically feasible form of processing device configured to process data and execute program code. The processor 202 may include, for example, and without limitation, one or more of a system-on-chip (SoC), a central processing unit (CPU), a graphics processing unit (GPU), an application-specific integrated circuit (ASIC), a digital signal processor (DSP), a field-programmable gate array (FPGA), and so forth. In general, processor 202 may be any technically feasible hardware unit or circuitry unit capable of processing data and/or executing logic, instructions, or program code.

I/O devices 204 may include input devices, output devices, and devices capable of both receiving input and providing output. For example, and without limitation, I/O devices 104 may include wired and/or wireless communication devices that send data to and/or receive data from remote databases, other computing systems or devices, etc. I/O devices 204 may also include one or more input and/or output devices for receiving input and outputting output. Examples of input devices include keyboards, mice, trackballs, joysticks, trackpads, touch-sensitive surfaces or displays, microphones or other audio input devices, cameras, physical controls (e.g., buttons, dials, etc.), sensors, and so forth. Examples of output devices include display screens, headphones, tactile output devices, light emitting devices, and so forth. Further, I/O devices 204 may include multiple ports 216 (e.g., Ethernet ports) for connecting to networking devices 106 and/or other network audio devices 106.

The network audio device 108 may connect to networking devices 106 and/or other network audio devices 108 via two or more ports 216-1 thru 216-n. A port 216 may be directly connected to a networking device 106 of a network or serially connected to another network audio device 108. Each of the ports 216 may be configured to be in a mode of receiving audio signals and/or control signals, or a mode of transmitting audio signals and/or control signals. In some embodiments, to support connections to multiple networks, each port 216 may be associated with an individual media access control (MAC) address. In some embodiments, the network audio device 108 include an internal physical-layer switch or selector (e.g., as one of the processors 202, as a device in I/O device 204, or other suitable hardware or circuitry within device 108) to select or switch amongst the ports 216.

Audio output device(s) 218 are devices that ultimately generate audible audio output from audio signals. Audio output device(s) 218 may include one or more of a digital signal processor (DSP), an amplifier, a preamplifier, and a speaker.

Memory 206 may include a memory module or a collection of memory modules. The memory 206 stores content, such as data and program code, for execution or use by the processor(s) 202. Memory 206 includes an audio module 208 and a control module 210. In some embodiments, memory 206 also includes a fault tolerance module 214.

The audio module 208 may process audio signals received from the source 102. The processing may include, for example, decoding, digital signal processing, or the like. In some embodiments, various types of processing may be performed by an audio output device 218 in conjunction with or instead of the audio module 208.

Control module 210 processes control signals received from the source 102 and modifies various aspects of the network audio device 108 based on the control signals. For example, the control module 210 could, in response to receiving one or more control signals, set or change various parameters at the network audio device 108 and/or set or modify the configurations of the ports 216. In some embodiments, device data specifying parameters, configurations, and so forth of the network audio device 108 are stored in memory 206 in any suitable data structure or format (e.g., a table, a database, etc.). Initial device data may be added to memory 206 during manufacturing of the network audio device 108 and modified in accordance with commands included in control signals transmitted from source 102.

Fault tolerance module 214 performs functions that facilitate fault tolerance. For example, fault tolerance module 214 could detect faults associated with the ports 216 (e.g., a fault associated with a port 216 itself, a fault associated with a network to which the port is connected, etc.) and then select a network for redundant audio and/or control signals, if one is available.

It should be appreciated that, while FIG. 2 shows audio module 208, control module 210, and fault tolerance module 214 as separate modules of program code stored in memory 206, the functionality of these modules may be implemented via any number of processors 202 (e.g., FPGAs or ASICs).

Figure 3A:
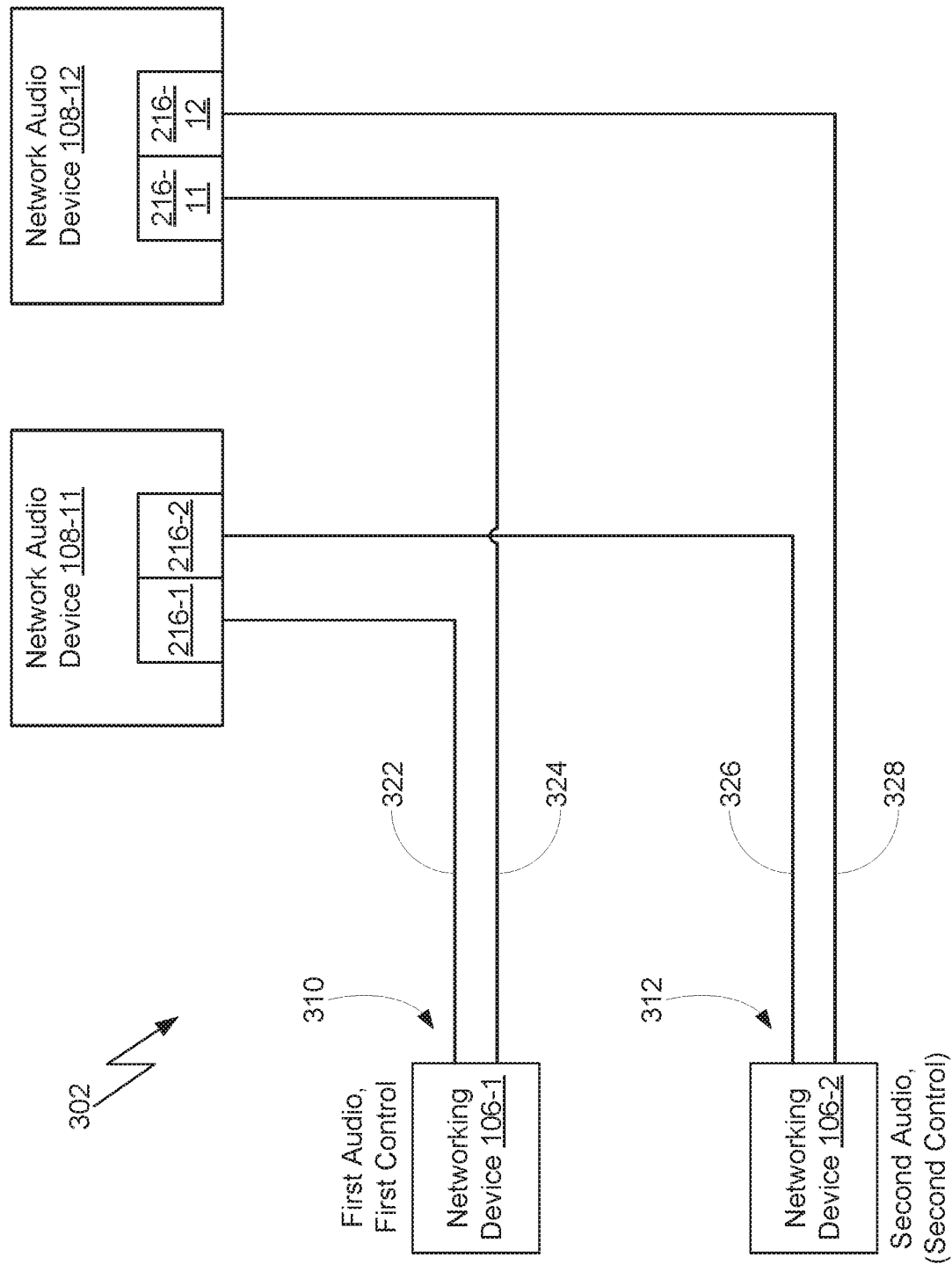
FIGS. 3A-3C are diagrams illustrating example configurations in which two ports of a network audio device are respectively connected to a network or to another network audio device, according to one or more aspects of the various embodiments.
Figure 3B:
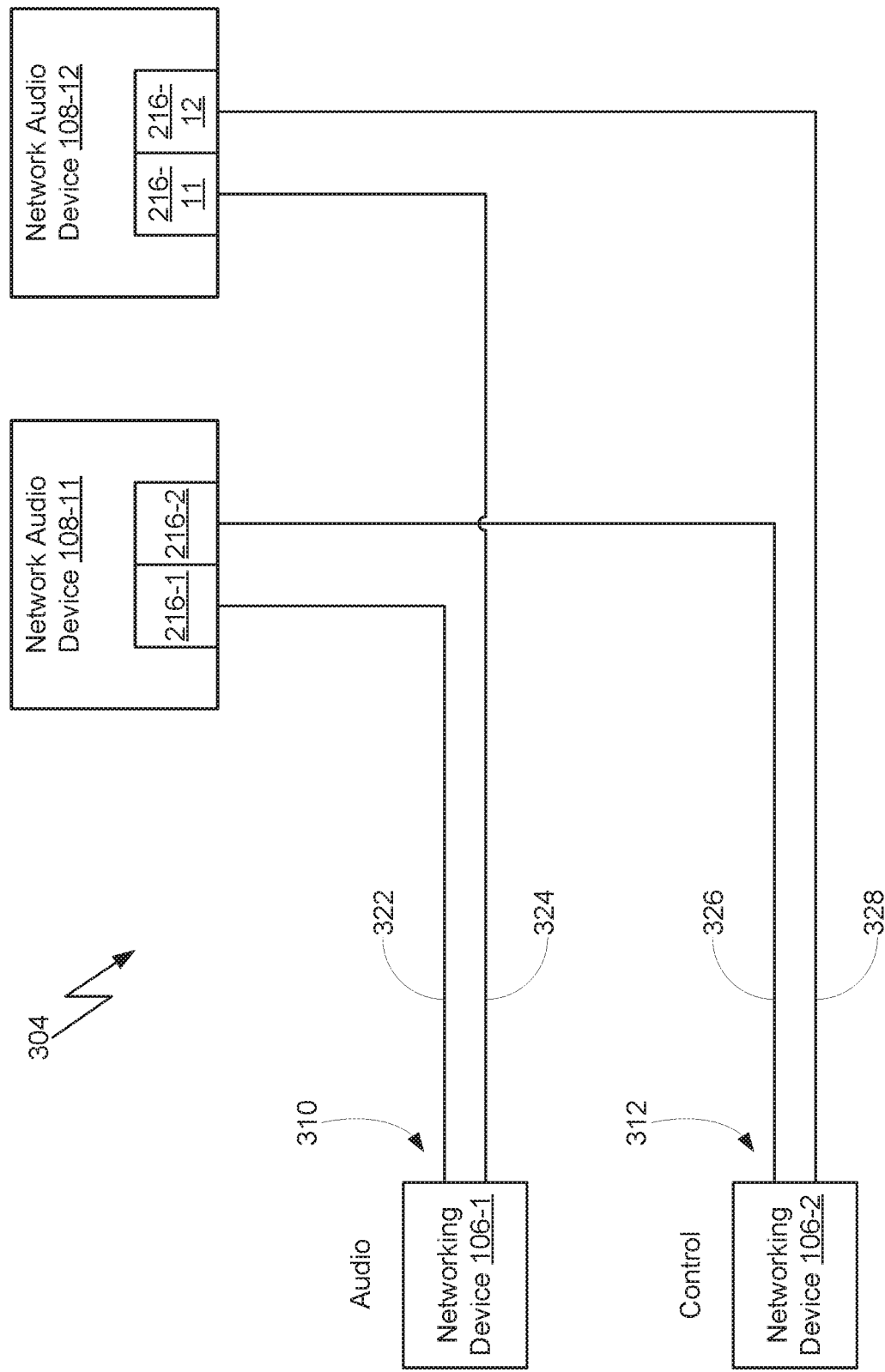
Figure 3C:
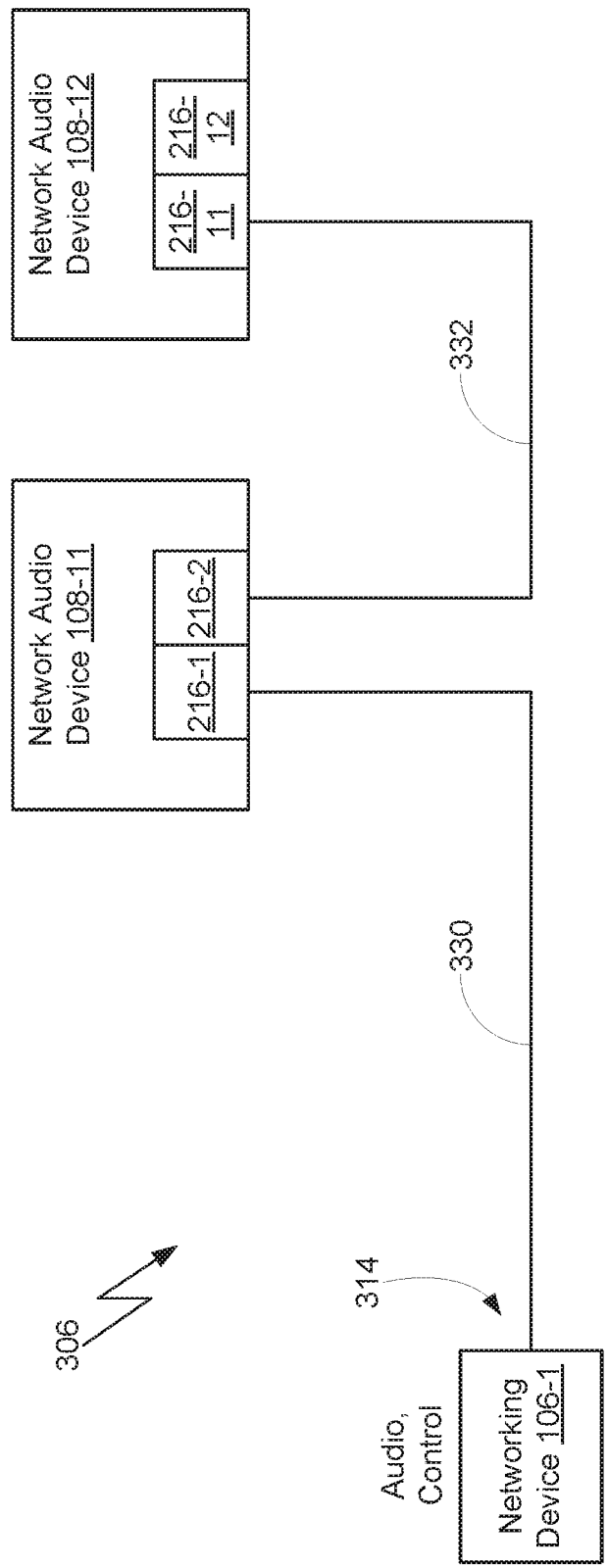

FIGS. 3A-3C illustrate example configurations in which two ports 216 of a network audio device 108 are respectively connected to a network or to another network audio device 108, according to one or more aspects of the various embodiments. As shown in FIG. 3A, in configuration 302, a first network 310 includes networking device 106-1 and connections to and from networking device 106-1. A second network 312 includes networking device 106-2 and connections to and from networking device 106-2. A source 102 (not shown in FIG. 3A) is communicatively coupled to both networks 310 and 312. Source 102 may transmit audio signals and control signals to network audio devices 108 via network 310. Source 102 may further transmit audio signals to network audio devices 108 via network 312. Additionally, in some embodiments, source 102 may also transmit control signals to network audio devices 108 via network 312.

As shown, network audio device 108-11 is connected to networking device 106-1 by a direct connection 322 at port 216-1 and is connected to networking device 106-2 by a direct connection 326 at port 216-2. Network audio device 108-11 may receive audio and control signals from the source 102 via network 310 and connection 322. Network audio device 108-11 may further receive audio signals (and, in some embodiments, control signals) from source 102 via network 312 and connection 326.

Network audio device 108-12 is connected to networking device 106-1 by a direct connection 324 at port 216-11 and is connected to networking device 106-2 by a direct connection 328 at port 216-12. Network audio device 108-12 may receive audio and control signals from the source 102 via network 310 and connection 324. Network audio device 108-12 may further receive audio signals (and, in some embodiments, control signals) from source 102 via network 312 and connection 328.

In configuration 302, fault tolerance is provided for network audio devices 108-11 and 108-12 by implementing connections to redundant networks 310 and 312. If, for example, a failure associated with port 216-1 occurs (e.g., if networking device 106-1 fails, if a cable in network 310 fails, if the port 216-1 itself fails, if connection 322 fails, etc.) and, thus, audio signals and/or control signals transmitted via network 310 and connection 322 are not properly received, then network audio device 108-11 may instead receive the audio signals and/or control signals via network 312 and connection 326. Similarly, in some embodiments, if a failure associated with port 216-2 occurs (e.g., if networking device 106-2 fails, if a cable in network 312 fails, if the port 216-2 itself fails, if connection 326 fails, etc.) and, thus, audio signals and/or control signals transmitted via network 312 and connection 326 are not properly received, then network audio device 108-11 may instead receive the audio signals and/or control signals via network 310 and connection 322. Network audio device 108-12 may implement similar fault tolerance via connections 324 and 328 to networking devices 106-1 and 106-2, respectively.

In some embodiments, source 102 may transmit audio and control signals via each of networks 310 and 312. In such embodiments, the network audio devices 108-11, 108-12 include redundancy for both audio signals and controls signals. In these embodiments, the fault tolerance described above may be performed with respect to both audio signals and control signals, since redundancy exists for both audio signals and control signals.

In some embodiments, source 102 may transmit audio signals, but not control signals, to network audio devices 108 via one of the networks 310 or 312. For example, source 102 could transmit audio signals and control signals via network 310 and could transmit audio signals, but not control signals, via network 312. Thus, in such embodiments, there would be redundancy for audio signals, but not control signals. In these embodiments, the fault tolerance described above would apply to audio signals, and not to control signals. For example, if a failure associated with port 216-1 occurs, then network audio device 108-11 may instead receive audio signals via network 312 and connection 326. However, network audio device 108-11 would be unable to receive control signals, since control signals are not transmitted via network 312. In such embodiments, the network audio device 108-11 may continue to operate using the parameters, configurations, etc. already in effect at the device at the time of the failure.

FIG. 3B illustrates a configuration 304 in which source 102 (not shown in FIG. 3B) transmits audio signals, but not control signals, to network audio devices 108 via network 310, and transmits control signals, but not audio signals, to network audio devices 108 via network 312. In configuration 304, network audio devices 108-11 and 108-12 receive audio signals via connections 322 and 324, respectively. Network audio devices 108-11 and 108-12 receive control signals via connections 326 and 328, respectively.

Thus, in configuration 304 there is no redundancy for audio signals or control signals. If network 310 or port 216-1/216-11 or connection 322/324 fails, then the network audio device 108-11/108-12 would be unable to receive audio signals, but may continue to receive control signals via network 312 and connection 326/328.

If network 312, port 216-2/216-12, or connection 326/328 fails, then the network audio device 108-11/108-12 would be unable to receive control signals, but may continue to receive audio signals via network 310 and connection 322/324. The network audio device 108-11/108-12 may continue to operate using the parameters, configurations, etc. already in effect at the device at the time of the failure.

As shown in FIG. 3C, in configuration 306, a network 314 includes networking device 106-1 and connections to and from networking device 106-1. A source 102 (not shown in FIG. 3C) is communicatively coupled to network 314. Source 102 may transmit audio signals and control signals to network audio devices 108 via network 314.

As shown, network audio device 108-11 is connected to networking device 106-1 by a direct connection 330 at port 216-1. Network audio device 108-11 is also connected to network audio device 108-12 by a serial connection 332 at port 216-2. Network audio device 108-11 may receive audio and control signals from the source 102 via network 314 and connection 330. Network audio device 108-11 may transmit the audio signals and control signals received from source 102 to network audio device 108-12 via connection 332.

Network audio device 108-12 is connected to the network audio device 108-11 by the serial connection 332 at port 216-11. Network audio device 108-12 may receive audio and control signals from the source 102 via network audio device 108-11 and connection 332. Network audio device 108-12 may be connected to another network audio device 108 by a serial connection at port 216-12.

In configuration 306, if network 314 or port 216-1 or connection 330 fails, then network audio devices 108-11 and 108-12 would be unable to receive audio signals and control signals, since there is no redundancy for the audio signals and control signals. If port 216-2 or port 216-11 fails or connection 332 fails, then network audio device 108-12 would be unable to receive audio signals and control signals, but network audio device 108-11 may continue to receive audio signals and control signals via connection 330. Thus, in configuration 306 and other configurations that include serial connections (e.g., configurations 404, 502, 602), the number of network audio devices 108 that are unable to receive audio signals and/or control signals due to failure may depend on the nature of the failure (e.g., the point of failure).

Figure 4A:
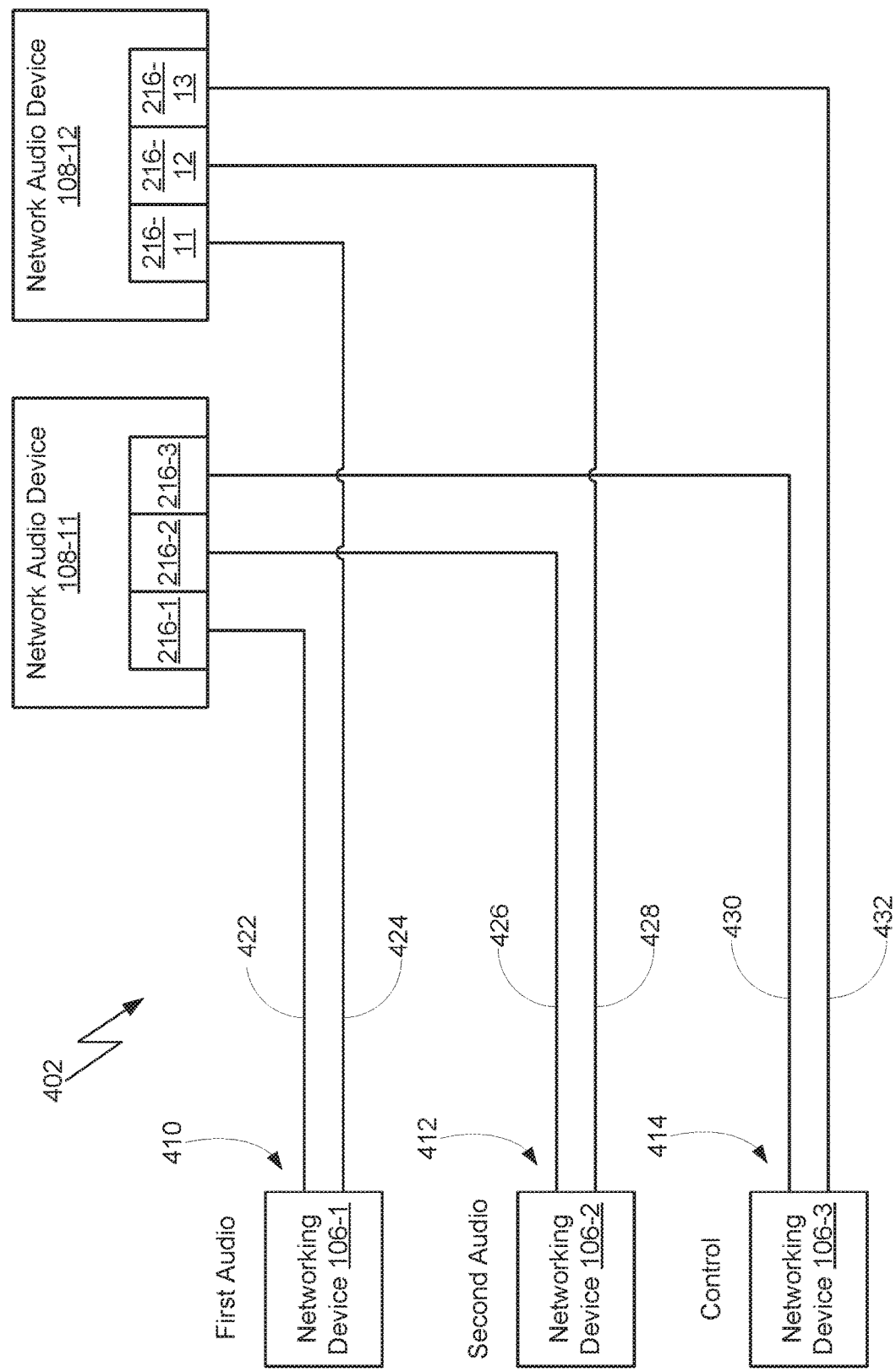
FIGS. 4A-4B are diagrams illustrating example configurations in which three ports of a network audio device are respectively connected to a network or to another network audio device, according to one or more aspects of the various embodiments.
Figure 4B:
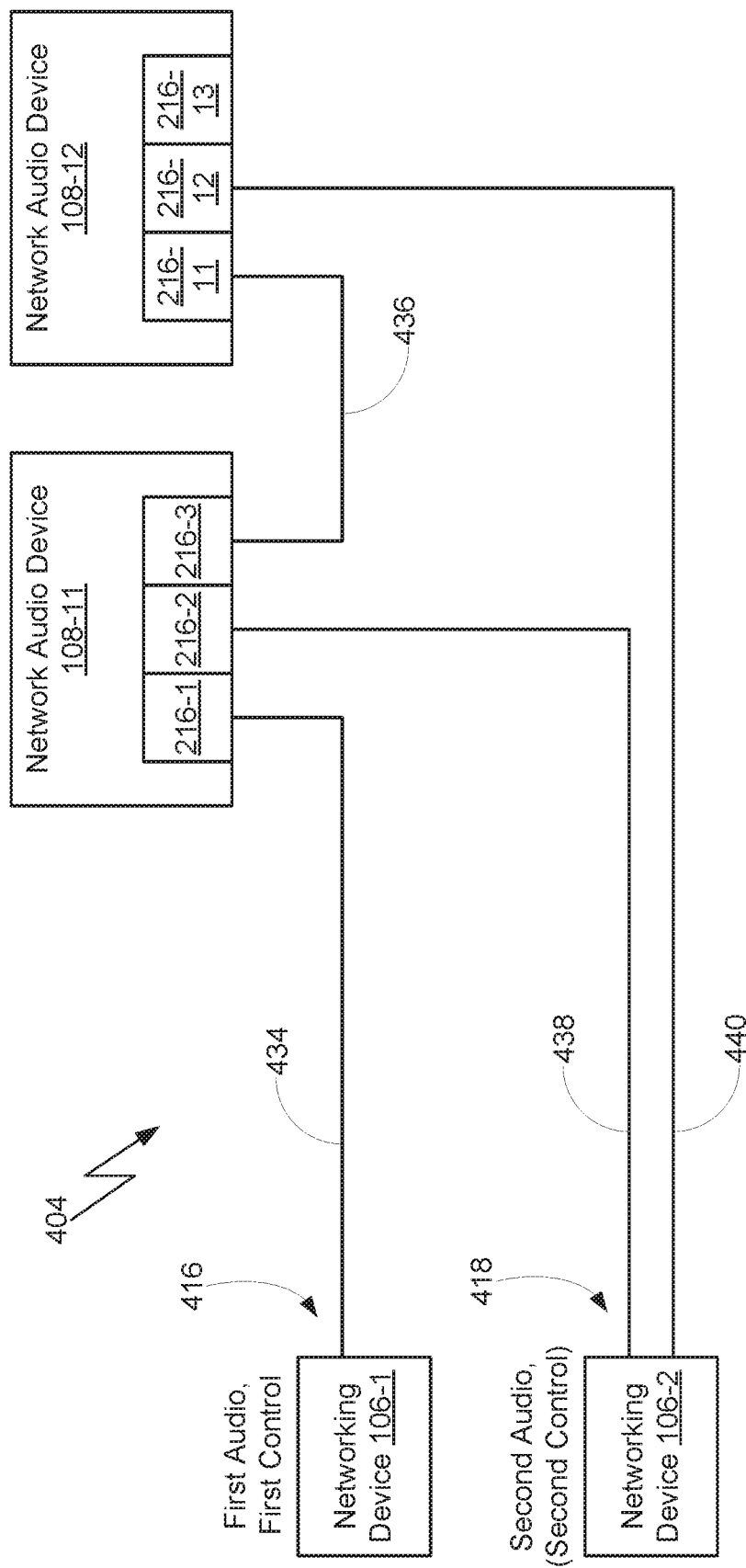

FIGS. 4A-4B illustrate example configurations in which three ports 216 of a network audio device 108 are respectively connected to a network or to another network audio device 108, according to one or more aspects of the various embodiments. It should be appreciated that the two-port configurations shown in FIGS. 3A-3C are also applicable to network audio devices 108 with three or more ports 216 (e.g., receive or transmit via two ports on the device and the remaining ports are unused).

As shown in FIG. 4A, in configuration 402, a first network 410 includes networking device 106-1 and connections to and from networking device 106-1. A second network 412 includes networking device 106-2 and connections to and from networking device 106-2. A third network 414 includes networking device 106-3 and connections to and from networking device 106-3. A source 102 (not shown in FIG. 4A) is communicatively coupled to networks 410, 412, and 414. Source 102 may transmit audio signals to network audio devices 108 via network 410. Source 102 may also transmit redundant audio signals to network audio devices 108 via network 412. Source 102 may further transmit control signals to network audio devices 108 via network 414.

As shown, network audio device 108-11 is connected to networking device 106-1 by a direct connection 422 at port 216-1, is connected to networking device 106-2 by a direct connection 426 at port 216-2, and is connected to networking device 106-3 by a direct connection 430 at port 216-3. Network audio device 108-11 may receive audio signals from the source 102 via network 410 and connection 422. Network audio device 108-11 may further receive audio signals from source 102 via network 412 and connection 426. Network audio device 108-11 may further receive control signals from source 102 via network 414 and connection 430.

Network audio device 108-12 is connected to networking device 106-1 by a direct connection 424 at port 216-11, is connected to networking device 106-2 by a direct connection 428 at port 216-12, and is connected to networking device 106-3 by a direct connection 432 at port 216-13. Network audio device 108-12 may receive audio signals from the source 102 via network 410 and connection 424. Network audio device 108-12 may further receive audio signals from source 102 via network 412 and connection 428. Network audio device 108-12 may further receive control signals from source 102 via network 414 and connection 432.

In configuration 402, fault tolerance is provided for network audio devices 108-11 and 108-12 with respect to audio signals by implementing connections to redundant networks 410 and 412. If, for example, a failure associated with port 216-1 occurs (e.g., if networking device 106-1 fails, if a cable in network 410 fails, if the port 216-1 itself fails, if connection 422 fails, etc.) and, thus, audio signals transmitted via network 410 and connection 422 are not properly received, then network audio device 108-11 may instead receive the audio signals via network 412 and connection 426. Similarly, in some embodiments, if a failure associated with port 216-2 occurs (e.g., if networking device 106-2 fails, if a cable in network 412 fails, if the port 216-2 itself fails, if connection 426 fails, etc.) and, thus, audio signals transmitted via network 412 and connection 426 are not properly received, then network audio device 108-11 may instead receive the audio signals via network 410 and connection 422. Network audio device 108-12 may implement similar fault tolerance via connections 424 and 428 to networking devices 106-1 and 106-2, respectively.

On the other hand, if a failure associated with port 216-3/216-13 occurs (e.g., if networking device 106-3 fails, if a cable in network 414 fails, if the port 216-3/216-13 itself fails, if connection 430/432 fails, etc.) and, thus, control signals transmitted via network 414 and connection 430/432 are not properly received, then the network audio device 108-11/108-12 would be unable to receive control signals, since control signals are not transmitted via network 410 or 412. In such circumstances, the network audio device 108-11/108-12 may continue to operate using the parameters, configurations, etc. already in effect at the device at the time of the failure.

As shown in FIG. 4B, in configuration 404, a first network 416 includes networking device 106-1 and connections to and from networking device 106-1. A second network 418 includes networking device 106-2 and connections to and from networking device 106-2. A source 102 (not shown in FIG. 4B) is communicatively coupled to both networks 416 and 418. Source 102 may transmit audio signals and control signals to network audio devices 108 via network 416. Source 102 may further transmit audio signals to network audio devices 108 via network 418. Additionally, in some embodiments, source 102 may also transmit control signals to network audio devices 108 via network 418.

As shown, network audio device 108-11 is connected to networking device 106-1 by a direct connection 434 at port 216-1 and is connected to networking device 106-2 by a direct connection 438 at port 216-2. Network audio device 108-11 may receive audio and control signals from the source 102 via network 416 and connection 434. Network audio device 108-11 may further receive audio signals (and, in some embodiments, control signals) from source 102 via network 418 and connection 438. Network audio device 108-11 is further connected to network audio device 108-12 by a serial connection 436 at port 216-3. Network audio device 108-11 may transmit the audio signals and control signals received from source 102 to network audio device 108-12 via connection 436.

Network audio device 108-12 is connected to network audio device 108-11 by the serial connection 436 at port 216-11 and is connected to networking device 106-2 by a direct connection 440 at port 216-12. Network audio device 108-12 may receive audio and control signals from the source 102 via network audio device 108-11 and connection 436. Network audio device 108-12 may further receive audio signals (and, in some embodiments, control signals) from source 102 via network 418 and connection 440. Network audio device 108-12 may be connected to another network audio device 108 by a serial connection at port 216-13.

In configuration 404, fault tolerance is provided for network audio devices 108-11 and 108-12 by implementing connections to redundant networks 416 and 418. If, for example, a failure associated with port 216-1 occurs (e.g., if networking device 106-1 fails, if a cable in network 416 fails, if the port 216-1 itself fails, if connection 434 fails, etc.) and, thus, audio signals and/or control signals transmitted via network 416 and connection 434 are not properly received, then network audio device 108-11 may instead receive the audio signals and/or control signals via network 418 and connection 438. Similarly, in some embodiments, if a failure associated with port 216-2 occurs (e.g., if networking device 106-2 fails, if a cable in network 418 fails, if the port 216-2 itself fails, if connection 438 fails, etc.) and, thus, audio signals and/or control signals transmitted via network 418 and connection 438 are not properly received, then network audio device 108-11 may instead receive the audio signals and/or control signals via network 416 and connection 434. Network audio device 108-12 may implement similar fault tolerance via connections 436 and 440 to network audio device 108-11 and networking 106-2, respectively.

In some embodiments, source 102 may transmit audio and control signals via each of networks 416 and 418. In such embodiments, the network audio devices 108-11, 108-12 include redundancy for both audio signals and controls signals. In these embodiments, the fault tolerance described above may be performed with respect to both audio signals and control signals, since redundancy exists for both audio signals and control signals.

In some embodiments, source 102 may transmit audio signals, but not control signals, to network audio devices 108 via one of the networks 416 or 418. For example, source 102 could transmit audio signals and control signals via network 416 and could transmit audio signals, but not control signals, via network 418. Thus, in such embodiments, there would be redundancy for audio signals, but not control signals. In these embodiments, the fault tolerance described above would apply to audio signals, but not to control signals. For example, if a failure associated with port 216-1 occurs, then network audio device 108-11 may instead receive audio signals via network 418 and connection 438. However, network audio device 108-11 would be unable to receive control signals, since control signals are not transmitted via network 416. In such embodiments, the network audio device 108-11 may continue to operate using the parameters, configurations, etc. already in effect at the device at the time of the failure.

In configuration 404, if network 416, port 216-1, or connection 434 fails, then network audio device 108-12 would be unable to receive audio signals and control signals via network audio device 108-11, since the network audio devices 108-11 and 108-12 are connected by a serial connection 436. In these circumstances, the network audio device 108-12 may receive audio signals (and, in some embodiments, also controls signals) via network 418 and connection 440. If port 216-3 or port 216-11 fails or connection 436 fails, then network audio device 108-12 would be unable to receive audio signals and control signals via network audio device 108-11, but network audio device 108-11 may continue to receive audio signals and control signals via network 416. Network audio device 108-12 would receive audio signals (and, in some embodiments, also controls signals) via network 418.

Figure 5:
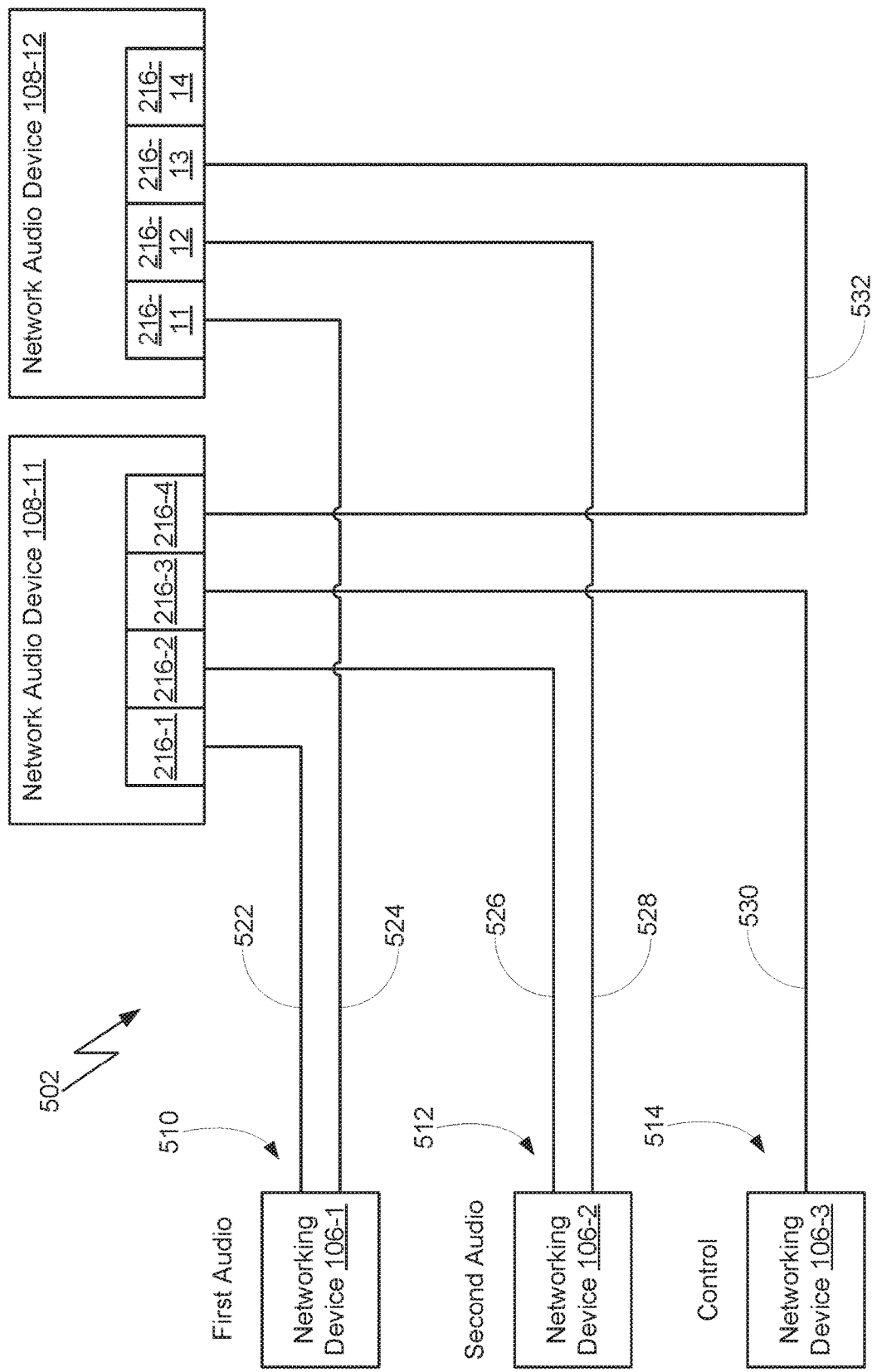
FIG. 5 is a diagram illustrating an example configuration in which four ports of a network audio device are respectively connected to a network or to another network audio device, according to one or more aspects of the various embodiments.

FIG. 5 illustrate an example configuration in which four ports 216 of a network audio device 108 are respectively connected to a network or to another network audio device 108, according to one or more aspects of the various embodiments. It should be appreciated that the two-port configurations shown in FIGS. 3A-3C and the three-port configurations shown in FIGS. 4A-4B are also applicable to network audio devices 108 with four or more ports 216.

As shown in FIG. 5, in configuration 502, a first network 510 includes networking device 106-1 and connections to and from networking device 106-1. A second network 512 includes networking device 106-2 and connections to and from networking device 106-2. A third network 514 includes networking device 106-3 and connections to and from networking device 106-3. A source 102 (not shown in FIG. 5) is communicatively coupled to networks 510, 512, and 514. Source 102 may transmit audio signals to network audio devices 108 via network 510. Source 102 may also transmit redundant audio signals to network audio devices 108 via network 512. Source 102 may further transmit control signals to network audio devices 108 via network 514.

As shown, network audio device 108-11 is connected to networking device 106-1 by a direct connection 522 at port 216-1, is connected to networking device 106-2 by a direct connection 526 at port 216-2, and is connected to networking device 106-3 by a direct connection 530 at port 216-3. Network audio device 108-11 may receive audio signals from the source 102 via network 510 and connection 522. Network audio device 108-11 may further receive audio signals from source 102 via network 512 and connection 526. Network audio device 108-11 may further receive control signals from source 102 via network 514 and connection 530.

Network audio device 108-12 is connected to networking device 106-1 by a direct connection 524 at port 216-11, is connected to networking device 106-2 by a direct connection 528 at port 216-12, and is connected to network audio device 108-11 by a serial connection 532 at port 216-13. Network audio device 108-12 may receive audio signals from the source 102 via network 510 and connection 524. Network audio device 108-12 may further receive audio signals from source 102 via network 512 and connection 528. Network audio device 108-12 may further receive control signals from source 102 via network audio device 108-11 and connection 532.

In configuration 502, fault tolerance is provided for network audio devices 108-11 and 108-12 with respect to audio signals by implementing connections to redundant networks 510 and 512. If, for example, a failure associated with port 216-1 occurs (e.g., if networking device 106-1 fails, if a cable in network 510 fails, if the port 216-1 itself fails, if connection 522 fails, etc.) and, thus, audio signals transmitted via network 510 and connection 522 are not properly received, then network audio device 108-11 may instead receive the audio signals via network 512 and connection 526. Similarly, in some embodiments, if a failure associated with port 216-2 occurs (e.g., if networking device 106-2 fails, if a cable in network 512 fails, if the port 216-2 itself fails, if connection 526 fails, etc.) and, thus, audio signals transmitted via network 512 and connection 526 are not properly received, then network audio device 108-11 may instead receive the audio signals via network 510 and connection 522. Network audio device 108-12 may implement similar fault tolerance via connections 524 and 528 to networking devices 106-1 and 106-2, respectively.

On the other hand, if a failure associated with port 216-3 occurs (e.g., if networking device 106-3 fails, if a cable in network 514 fails, if the port 216-3 itself fails, if connection 530 fails, etc.) and, thus, control signals transmitted via network 514 and connection 530 are not properly received, then the network audio devices 108-11 and 108-12 would be unable to receive control signals, since control signals are not transmitted via network 510 or 512. In such circumstances, the network audio devices 108-11 and 108-12 may continue to operate using the parameters, configurations, etc. already in effect at the respective device at the time of the failure.

If a failure associated with port 216-13 occurs (e.g., if connection 532 fails, if the port 216-13 itself fails, if port 216-4 fails, etc.) and, thus, control signals transmitted via connection 532 are not properly received, then the network audio device 108-12 would be unable to receive control signals, since control signals are not transmitted via network 510 or 512. The network audio device 108-12 may continue to operate using the parameters, configurations, etc. already in effect at the device at the time of the failure. However, network audio device 108-11 may continue to receive control signals via network 514 and connection 530.

Figure 6:
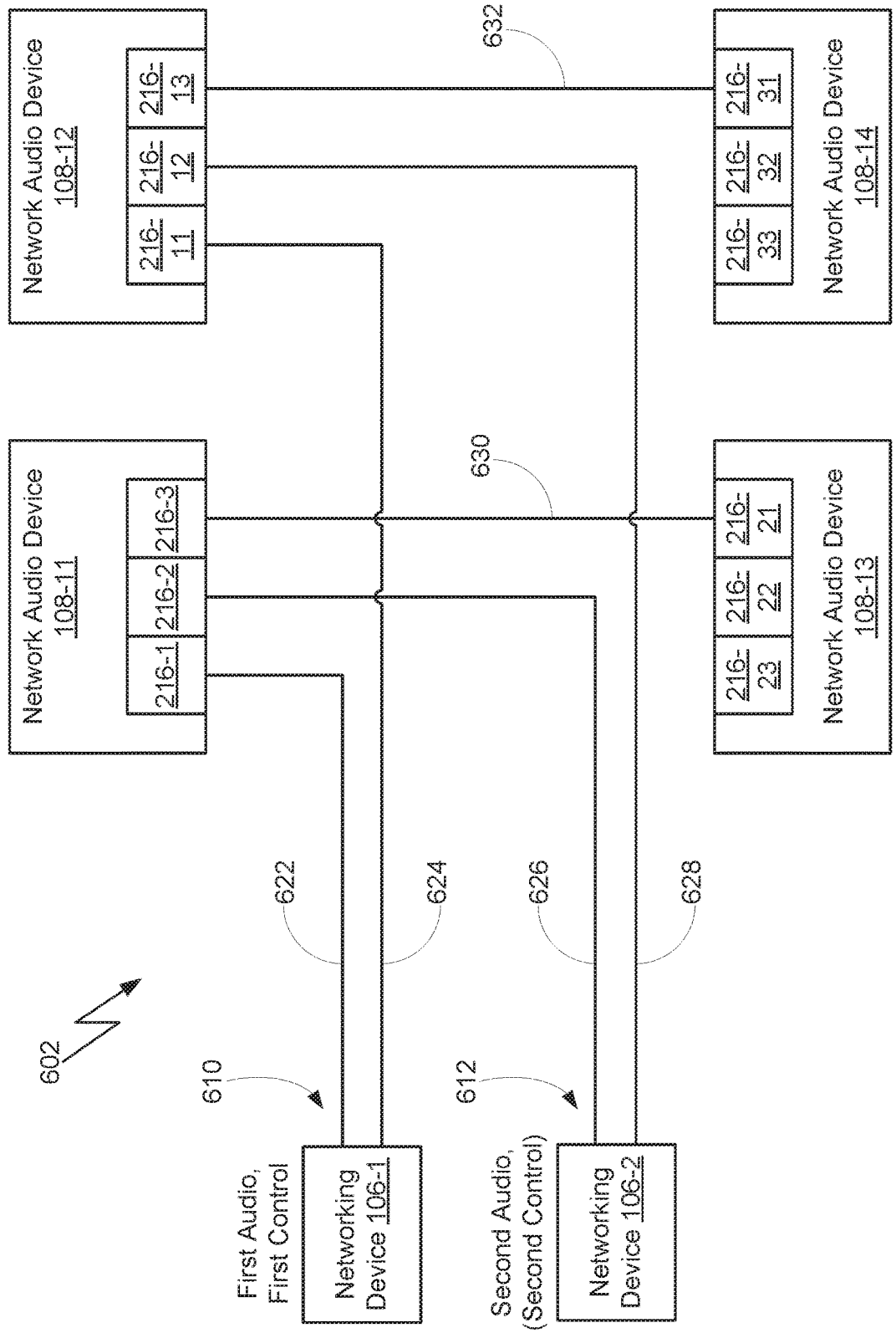
FIG. 6 is a diagram illustrating an example configuration in which a network audio device has direct connections and serial connections via a plurality of ports on the network audio device, according to one or more aspects of the various embodiments.

FIG. 6 illustrates an example configuration in which a network audio device 108 has direct connections and serial connections via a plurality of ports 216 on the network audio device, according to one or more aspects of the various embodiments. As shown in FIG. 6, in configuration 602, a first network 610 includes networking device 106-1 and connections to and from networking device 106-1. A second network 612 includes networking device 106-2 and connections to and from networking device 106-2. A source 102 (not shown in FIG. 6) is communicatively coupled to both networks 610 and 612. Source 102 may transmit audio signals and control signals to network audio devices 108 via network 610. Source 102 may further transmit audio signals to network audio devices 108 via network 612. Additionally, in some embodiments, source 102 may also transmit control signals to network audio devices 108 via network 612.

As shown, network audio device 108-11 is connected to networking device 106-1 by a direct connection 622 at port 216-1 and is connected to networking device 106-2 by a direct connection 626 at port 216-2. Network audio device 108-11 may receive audio and control signals from the source 102 via network 610 and connection 622. Network audio device 108-11 may further receive audio signals (and, in some embodiments, control signals) from source 102 via network 612 and connection 626.

Network audio device 108-12 is connected to networking device 106-1 by a direct connection 624 at port 216-11 and is connected to networking device 106-2 by a direct connection 628 at port 216-12. Network audio device 108-12 may receive audio and control signals from the source 102 via network 610 and connection 624. Network audio device 108-12 may further receive audio signals (and, in some embodiments, control signals) from source 102 via network 612 and connection 628. Thus, with respect to the connections between network audio devices 108-11, 108-12 and networks 610 and 612, configuration 602 is similar to configuration 302.

In configuration 602, network audio device 108-11 is further connected, at port 216-3, to network audio device 108-13, at port 216-21, by a serial connection 630. Network audio device 108-13 receives audio and/or control signals from network audio device 108-11 via connection 630. Network audio device 108-12 is further connected, at port 216-13, to network audio device 108-14, at port 216-31, by a serial connection 632. Network audio device 108-14 receives audio and/or control signals from network audio device 108-12 via connection 632. As with other configurations with serial connections described above (e.g., configurations 306, 404, and 502), depending on the nature of the failure, network audio devices 108-13 and/or 108-14 may not properly receive audio signals and/or control signals if a failure occurs.

For sake of simplicity, the configurations shown in FIGS. 3A-6 are described in conjunction with a limited number of networking audio devices. It should be appreciated that the configurations shown in FIGS. 3A-6 are applicable to network audio systems with more or less network audio devices 108 than the number shown in these figures. Furthermore, it should be appreciated that the configurations shown in FIGS. 3A-6 are examples and non-exhaustive. Other configurations are possible in accordance with one or more aspects of the various embodiments.

In some embodiments, a source 102 transmits signals over multiple, redundant networks concurrently; the source 102 transmits the same signals over the multiple networks. For example, in configurations with redundant networks for audio signals (e.g., configurations 302, 402, 404, 502, and 602), the source 102 transmits the same audio signals over multiple (e.g., two) networks concurrently. A network audio device 108 receives the audio signals from the multiple networks concurrently. The network audio device 108 may process the concurrent audio signals from the multiple networks concurrently, or default to processing the audio signals received from one of the multiple networks until the audio signals from that network are not properly received. When the network audio device is not properly receiving audio signals from one of the networks (e.g., due to failure of the network or the connected port, etc.), the network audio device may select the port connected to another one of the networks and receive audio signals via the selected port. In some embodiments, selecting the redundant network does not require an active switching mechanism. Instead, selecting the redundant mechanism may occur by processing audio and/or control signals from the redundant network instead of processing the audio and/or control signals received via the original network that experienced a failure.

In some other embodiments, a source 102 transmits the same signals over multiple networks concurrently. A network audio device 108 receives the signals from a first one of the networks via a first port 216. The network audio device 108 may disregard signals received from the second one of the networks via a second port 216 connected to the second one of the networks (e.g., the network audio device disables the second port, the network audio device ignores the signals received via the second port, etc.), until the network audio device is not properly receiving the signals from the first one of the networks (e.g., a failure in the first one of the networks, etc.). In such a circumstance, the network audio device 108 (e.g., the fault tolerance module 214) detects the failure. In response to detecting the failure, the network audio device 108 (e.g., the fault tolerance module 214) selects (e.g., enables, switches to) the second port for receiving signals from the second one of the networks to which the second port is connected.

Figure 7:
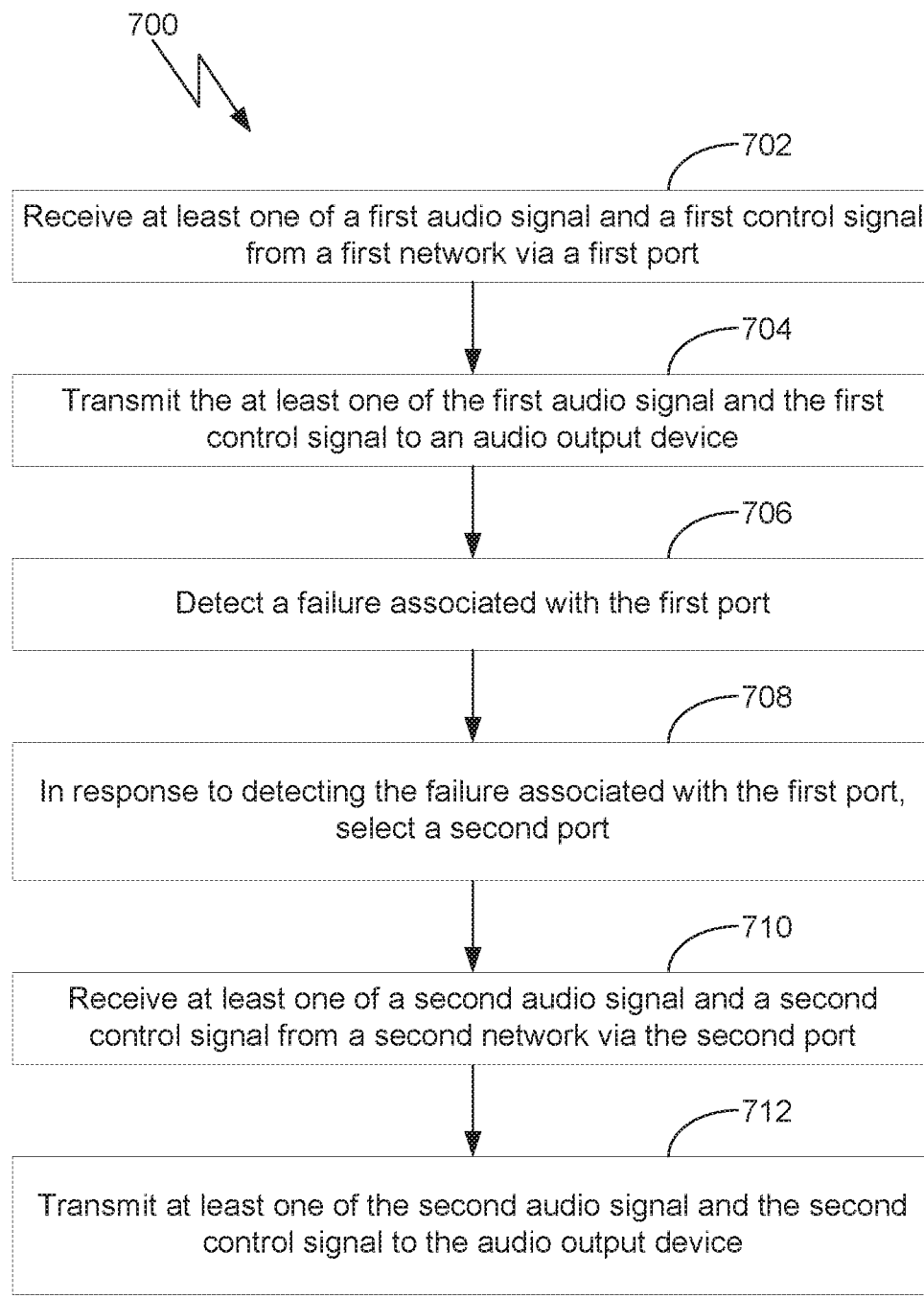
FIG. 7 is a flow diagram of method steps for implementing a redundant port of a network audio device in response to detecting a failed port, according to various embodiments.

FIG. 7 is a flow diagram of method steps for implementing a redundant port of a network audio device in response to detecting failed port, according to various embodiments. Although the method steps are described with respect to the systems of FIGS. 1-2, persons skilled in the art will understand that any system configured to implement the method steps, in any order, falls within the scope of the contemplated embodiments.

As shown, a method 700 begins at step 702, where a network audio device 108 receives at least one of a first audio signal and a first control signal from a first network via a first port 216 of the network audio device 108. The first audio signal and/or the first control signal may be received from a first networking device 106 included in the first network (e.g., in the case of a direct connection from the first port 216 to the first networking device), or received from another network audio device 108 (e.g., in the case of a serial connection from the first port 216 to the another network audio device 108). At step 704, the network audio device 108 transmits the at least one of the first audio signal and the first control signal to an audio output device 218.

At step 706, the network audio device 108 (e.g., the fault tolerance module 214) detects a failure associated with the first port 216. The failure associated with the first port may include a failure of the first port 216 itself, a failure of the first network (e.g., a failure of a networking device in the first network, a failure of a cable in the first network), a failure of a connection at the first port, and/or a failure of another network audio device 108 serially connected to the first port, that causes an interruption of receipt of the audio signal and/or control signal by the network audio device 108. In some embodiments, the network audio device 108 (e.g., the fault tolerance module 214) may detect a failure associated with the first port 216 by detecting that the first audio signal and/or the first control signal are no longer being received via the first port 216.

At step 708, in response to detecting the failure associated with the first port 216, the network audio device 108 (e.g., the fault tolerance module 214) selects a second port 216 included in the network audio device 108. At step 710, the network audio device 108 receives at least one of a second audio signal and a second control signal from a second network via the second port 216. The second audio signal and/or the second control signal may be received from a second networking device 106 included in the second network (e.g., in the case of a direct connection from the second port 216 to the second networking device), or received from another network audio device 108 (e.g., in the case of a serial connection from the second port 216 to the another network audio device 108). At step 712, the network audio device 108 transmits the second audio signal and/or the second control signal to the audio output device 218. In some embodiments, the fault tolerance module 214 may activate a physical-layer switch or selector to select the second port.

In some embodiments, at step 708, selecting a second port 216 may include the fault tolerance module 214 actively switching from the first port 216 to the second port 216 in response to detecting the failure associated with the first port. For example, the fault tolerance module 214 could detect a failure on the first port 216 and then transmit an indication to a networking device 106 that audio signals and/or control signals should instead be transmitted to the network audio device 108 via the second port 216. The network audio device 108 could then receive the audio signals and/or control signals via the second port 216 and continue operation, without significant interruption. In some embodiments, the fault tolerance module 214 may activate a physical-layer switch or selector to switch from the first port to the second port.

In other embodiments, during normal operation, the network audio device 108 may concurrently receive audio signals and/or control signals from both the first port 216 and the second port 216. In such embodiments, during normal operation, the network audio device 108 may process only the control signals that are received via the first port 216 and/or transmit, to the audio output device(s) 218, only the audio signals that are received via the first port 216. Then, when a failure is detected on the first port 216 at step 706, at step 708, the fault tolerance module 214 may instead implement the audio signals and/or control signals that are received on the second port 216, such as by processing those control signals and/or transmitting those audio signals to the audio output device(s) 218 at step 712.

In sum, a network audio module includes multiple input/output connections that may be configured for parallel connections and/or serial connections. Network audio signals and control signals may be provided within a network audio system in distinct channels or in mixed channels. The network audio system may also include redundant channels for audio and/or control signals. Ports on a network audio device may each be configured to connect in parallel to individual channels, or to another network audio device in series. The configuration of ports at a network audio device may be set in accordance with signals sent from a control source within the network audio system. Additionally, if the ports are connected to redundant channels, then the network audio device may select the redundant channel in case of a failure on the other channel.

One advantage of the techniques described herein is that a network audio device can be configured to provide various levels of fault tolerance while also reducing physical cabling requirements of a network audio system. Particularly, a network audio device may be configured to implement direct connections and/or serial connections, thereby facilitating fault tolerance and/or reduced cabling costs. By providing for serial connections, cabling costs may be reduced. Furthermore, the techniques described herein enable mixing of direct connections and serial connections within a network audio system, which provides users of network audio systems more flexibility in adapting network audio systems to different venues and requirements.

1. In some embodiments, an audio device comprises a plurality of ports; and at least one circuit coupled to the plurality of ports, the at least one circuit configured to: receive, from a first network via a first port included in the plurality of ports, at least one of a first audio signal and a first control signal; transmit the at least one of the first audio signal and the first control signal to an audio output device;

detect a failure associated with the first port; and in response to detecting the failure, transmit at least one of a second audio signal and a second control signal to the audio output device, wherein the at least one of the second audio signal and the second control signal is received from a second network via a second port included in the plurality of ports.

2. The audio device of clause 1, wherein, prior to detecting the failure, the at least one circuit is further configured to concurrently (i) receive the at least one of the first audio signal and the first control signal from the first network via the first port, and (ii) receive the at least one of the second audio signal and the second control signal from the second network via the second port.

3. The audio device of clauses 1 or 2, wherein the at least one of the first audio signal and the first control signal is synchronized with the at least one of the second audio signal and the second control signal.

4. The audio device of any of clauses 1-3, wherein the at least one of the first audio signal and the first control signal is the same as the at least one of the second audio signal and the second control signal.

5. The audio device of any of clauses 1-4, wherein the at least one circuit is further configured to, in response to detecting the failure, switch from receiving the at least one of the first audio signal and the first control signal from the first network via the first port, to receiving the at least one of the second audio signal and the second control signal from the second network via the second port.

6. The audio device of any of clauses 1-5, wherein the at least one circuit is further configured to, in response to detecting the failure: select the second port; and transmit the at least one of the second audio signal and the second control signal to the audio output device instead of transmitting the at least one of the first audio signal and the first control signal to the audio output device.

7. The audio device of any of clauses 1-6, wherein the at least one circuit is configured to, in a first connection mode: receive the at least one of the first audio signal and the first control signal via a first home run connection from the first port to a first networking device; and receive the at least one of the second audio signal and the second control signal via a second home run connection from the second port to a second networking device.

8. The audio device of any of clauses 1-7, wherein the at least one circuit is configured to, in a second connection mode: receive at least one of a third audio signal and a third control signal via a first serial connection from the first port to a second audio device; and transmit the at least one of the third audio signal and the third control signal via a second serial connection from the second port to a third audio device.

9. The audio device of any of clauses 1-8, wherein the at least one circuit is configured to, in the second connection mode, receive at least one of a fourth audio signal and a fourth control signal via a second home run connection from a third port to a third networking device, wherein the third port is included in the plurality of ports.

10. The audio device of any of clauses 1-9, wherein the audio output device comprises at least one of an amplifier, a preamplifier, a speaker, a decoder, and a digital signal processor (DSP).

11. The audio device of any of clauses 1-10, wherein the plurality of ports, the at least one circuit, and the audio output device are included in a powered network speaker housing.

12. In some embodiments, a method for transmitting audio signals at an audio device having a plurality of ports comprises receiving, from a first network via a first port included in the plurality of ports, at least one of a first audio signal and a first control signal; transmitting the at least one of the first audio signal and the first control signal to an audio output device; detecting a failure associated with the first port; and in response to detecting the failure: selecting a second port included in the plurality of ports; receiving, from a second network via the second port, at least one of a second audio signal and a second control signal; and transmitting the at least one of the second audio signal and the second control signal to the audio output device.

13. The method of clause 12, further comprising, prior to detecting the failure, concurrently (i) receiving the at least one of the first audio signal and the first control signal from the first network via the first port, and (ii) receiving the at least one of the second audio signal and the second control signal from the second network via the second port.

14. The method of clauses 12 or 13, wherein the at least one of the first audio signal and the first control signal is synchronized with the at least one of the second audio signal and the second control signal.

15. The method of any of clauses 12-14, wherein the at least one of the first audio signal and the first control signal is the same as the at least one of the second audio signal and the second control signal.

16. The method of any of clauses 12-15, wherein selecting the second port comprises actively switching from receiving the at least one of the first audio signal and the first control signal from the first network via the first port, to receiving the at least one of the second audio signal and the second control signal from the second network via the second port.

17. The method of any of clauses 12-16, wherein detecting the failure associated with the first port comprises detecting at least one of a failure of the first port and a failure of the first network.

18. The method of any of clauses 12-17, further comprising transmitting the at least one of the first audio signal and the first control signal to a second audio device via a third port included in the plurality of ports.

19. The method of any of clauses 12-18, further comprising receiving the at least one of the second audio signal and the second control signal from a third audio device via a fourth port included in the plurality of ports.

20. In some embodiments, a non-transitory computer-readable storage medium includes instructions that, when executed by one or more processors, configure the one or more processors to perform the steps of: receiving, from a first network via a first port included in a plurality of ports of an audio device, at least one of a first audio signal and a first control signal; transmitting the at least one of the first audio signal and the first control signal to an audio output device; in response to detecting at least one of a failure of the first port and a failure of the first network, transmitting at least one of a second audio signal and a second control signal to the audio output device, wherein the at least one of the second audio signal and the second control signal is received from a second network via a second port included in the plurality of ports.

Any and all combinations of any of the claim elements recited in any of the claims and/or any elements described in this application, in any fashion, fall within the contemplated scope of the described embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed towards embodiments of the present disclosure, other and further embodiments of the disclosure may be devised without departing from the basic scope thereof, and the scope thereof is determined by the claims that follow.

What is claimed is:

1. A network audio device, comprising:
a plurality of ports;
an audio output device; and
at least one circuit coupled to the plurality of ports, wherein the at least one circuit is configured to:
receive, by the at least one circuit from a first network via a second network audio device and a first connection at a first port included in the plurality of ports, at least one of a first audio signal or a first control signal;
transmit the at least one of the first audio signal or the first control signal to the audio output device;
detect a failure associated with the first port; and
in response to detecting the failure, transmit at least one of a second audio signal or a second control signal to the audio output device,
wherein the at least one of the second audio signal or the second control signal is received by the at least one circuit from a second network via a second port included in the plurality of ports.

2. The network audio device of claim 1, wherein, prior to detecting the failure, the at least one circuit is further configured to concurrently:
receive the at least one of the first audio signal or the first control signal from the first network via the first port, and
receive the at least one of the second audio signal or the second control signal from the second network via the second port.

3. The network audio device of claim 2, wherein the at least one of the first audio signal or the first control signal is synchronized with the at least one of the second audio signal or the second control signal.

4. The network audio device of claim 2, wherein the at least one of the first audio signal or the first control signal is the same as the at least one of the second audio signal or the second control signal.

5. The network audio device of claim 1, wherein the at least one circuit is further configured to, in response to detecting the failure, switch from receiving the at least one of the first audio signal or the first control signal from the first network via the first port, to receiving the at least one of the second audio signal or the second control signal from the second network via the second port.

6. The network audio device of claim 1, wherein the at least one circuit is further configured to, in response to detecting the failure:
select the second port; and
transmit the at least one of the second audio signal or the second control signal to the audio output device instead of transmitting the at least one of the first audio signal or the first control signal to the audio output device.

7. The network audio device of claim 1, wherein the at least one circuit is further configured to, in a first connection mode:
   receive the at least one of the first audio signal or the first control signal via a first home run connection at the first port; and
   receive the at least one of the second audio signal or the second control signal via a second home run connection from the second port to a first networking device.

8. The network audio device of claim 1, wherein the at least one circuit is further configured to, in a first connection mode:
   receive, via a first serial connection between the first port and the second network audio device, the at least one of the first audio signal or the first control signal; and
   transmit, via a second serial connection between a third port and a third network audio device, the at least one of the first audio signal or the first control signal, wherein the third port is included in the plurality of ports.

9. The network audio device of claim 7, wherein the at least one circuit is configured to, in a second connection mode, receive at least one of a third audio signal or a third control signal via a third home run connection from a third port to a third second networking device, wherein the third port is included in the plurality of ports.

10. The network audio device of claim 1, wherein the audio output device comprises at least one of an amplifier, a preamplifier, a speaker, a decoder, and a digital signal processor (DSP).

11. The network audio device of claim 10, wherein the plurality of ports, the at least one circuit, and the audio output device are included in a powered network speaker housing.

12. A method for transmitting audio signals at a first network audio device having a plurality of ports, comprising:
   receiving, by the first network audio device from a first network via a second network audio device and a first connection at a first port included in the plurality of ports, at least one of a first audio signal or a first control signal;
   transmitting the at least one of the first audio signal and the first control signal to an audio output device included in the first network audio device;
   detecting a failure associated with the first port; and
   in response to detecting the failure:
      selecting a second port included in the plurality of ports;
      receiving, by the first network audio device from a second network via the second port, at least one of a second audio signal or a second control signal; and
      transmitting the at least one of the second audio signal or the second control signal to the audio output device.

13. The method of claim 12, further comprising, prior to detecting the failure, concurrently:
   receiving the at least one of the first audio signal or the first control signal from the first network via the first port, and
   receiving the at least one of the second audio signal or the second control signal from the second network via the second port.

14. The method of claim 13, wherein the at least one of the first audio signal or the first control signal is synchronized with the at least one of the second audio signal or the second control signal.

15. The method of claim 13, wherein the at least one of the first audio signal or the first control signal is the same as the at least one of the second audio signal and the second control signal.

16. The method of claim 12, wherein selecting the second port comprises actively switching from receiving the at least one of the first audio signal and or the first control signal from the first network via the first port, to receiving the at least one of the second audio signal or the second control signal from the second network via the second port.

17. The method of claim 12, wherein detecting the failure associated with the first port comprises detecting at least one of a failure of the first port or a failure of the first network.

18. The method of claim 12, further comprising transmitting the at least one of the first audio signal or the first control signal to a third network audio device via a third port included in the plurality of ports.

19. The method of claim 12, further comprising receiving the at least one of the second audio signal or the second control signal from a third network audio device via a third port included in the plurality of ports.

20. One or more non-transitory computer-readable storage media including instructions that, when executed by one or more processors, cause the one or more processors to perform the steps of:
   receiving, by a first network audio device from a first network via a second network audio device and a first connection at a first port included in a plurality of ports, at least one of a first audio signal or a first control signal;
   transmitting the at least one of the first audio signal and the first control signal to an audio output device included in the first network audio device;
   in response to detecting at least one of a failure of the first port and a failure of the first network, transmitting at least one of a second audio signal or a second control signal to the audio output device,
   wherein the at least one of the second audio signal or the second control signal is received by the first network audio device from a second network via a second port included in the plurality of ports.

* * * * *